United States Patent
Ju et al.

(10) Patent No.: US 9,514,705 B2
(45) Date of Patent: Dec. 6, 2016

(54) DATA PROCESSING APPARATUS WITH ADAPTIVE COMPRESSION ALGORITHM SELECTION BASED ON VISIBILITY OF COMPRESSION ARTIFACTS FOR DATA COMMUNICATION OVER DISPLAY INTERFACE AND RELATED DATA PROCESSING METHOD

(71) Applicant: MEDIATEK INC., Hsin-Chu (TW)

(72) Inventors: Chi-Cheng Ju, Hsinchu (TW); Tsu-Ming Liu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 13/957,430

(22) Filed: Aug. 2, 2013

(65) Prior Publication Data

US 2014/0098115 A1    Apr. 10, 2014

Related U.S. Application Data

(60) Provisional application No. 61/711,319, filed on Oct. 9, 2012, provisional application No. 61/712,949, filed on Oct. 12, 2012.

(51) Int. Cl.
*H04N 19/10* (2014.01)
*G06F 3/14* (2006.01)
(Continued)

(52) U.S. Cl.
CPC .............. *G09G 5/006* (2013.01); *G06F 3/14* (2013.01); *G06T 1/20* (2013.01); *G06T 9/00* (2013.01);
(Continued)

(58) Field of Classification Search
CPC ....... H04N 19/10; G06F 3/14; G09G 2340/02; G09G 2340/04
(Continued)

(56) References Cited

U.S. PATENT DOCUMENTS

| 4,424,565 A | 1/1984 | Larson |
| 5,553,160 A * | 9/1996 | Dawson .................. 382/166 |

(Continued)

FOREIGN PATENT DOCUMENTS

| CN | 1359048 A | 7/2002 |
| CN | 1610408 A | 4/2005 |

(Continued)

OTHER PUBLICATIONS

"International Search Report" mailed on Dec. 19, 2013 for International application No. PCT/CN2013/083118, International filing date: Sep. 9, 2013.

(Continued)

*Primary Examiner* — Joni Richer
(74) *Attorney, Agent, or Firm* — Winston Hsu; Scott Margo

(57) ABSTRACT

A data processing apparatus has a compressor and an output interface. The compressor receives an input display data, and generates an output display data according to the input display data. The output interface packs the output display data into an output bitstream, and outputs the output bitstream via a display interface. The compressor adaptively adjusts a compression algorithm applied to the input display data according to visibility of compression artifacts. By way of example, the display interface may be a display serial interface (DSI) standardized by a Mobile Industry Processor Interface (MIPI) or an embedded display port (eDP) standardized by a Video Electronics Standards Association (VESA).

16 Claims, 9 Drawing Sheets

(51) Int. Cl.
| | |
|---|---|
| *G09G 5/00* | (2006.01) |
| *G06T 1/20* | (2006.01) |
| *G06T 9/00* | (2006.01) |
| *H04N 19/172* | (2014.01) |
| *H04N 19/12* | (2014.01) |
| *H04N 19/136* | (2014.01) |
| *H04N 19/156* | (2014.01) |
| *H04N 19/164* | (2014.01) |

(52) U.S. Cl.
CPC .............. *G09G 5/005* (2013.01); *H04N 19/10* (2014.11); *H04N 19/12* (2014.11); *H04N 19/136* (2014.11); *H04N 19/156* (2014.11); *H04N 19/164* (2014.11); *H04N 19/172* (2014.11); *G09G 2330/021* (2013.01); *G09G 2340/02* (2013.01); *G09G 2340/04* (2013.01); *G09G 2350/00* (2013.01); *G09G 2370/10* (2013.01)

(58) Field of Classification Search
USPC ......................................... 345/501, 520, 660
See application file for complete search history.

(56) References Cited

U.S. PATENT DOCUMENTS

| | | | | |
|---|---|---|---|---|
| 5,760,760 | A | 6/1998 | Helms | |
| 5,943,508 | A | 8/1999 | Penney | |
| 6,031,929 | A * | 2/2000 | Maitz | G06F 19/321 |
| | | | | 375/E7.076 |
| 6,353,699 | B1 | 3/2002 | Schwab | |
| 6,704,022 | B1 | 3/2004 | Aleksic | |
| 6,914,637 | B1 | 7/2005 | Wolf | |
| 7,822,278 | B1 | 10/2010 | Hobbs | |
| 7,903,119 | B2 | 3/2011 | Hochmuth | |
| 7,930,436 | B1 | 4/2011 | Znosko | |
| 8,112,513 | B2 | 2/2012 | Margulis | |
| 8,145,813 | B2 | 3/2012 | Ho | |
| 8,179,971 | B1 | 5/2012 | Gough | |
| 8,363,969 | B1 | 1/2013 | Wang | |
| 8,599,316 | B2 | 12/2013 | Deever | |
| 2002/0030675 | A1 | 3/2002 | Kawai | |
| 2002/0057265 | A1 | 5/2002 | Tamura | |
| 2002/0105905 | A1 | 8/2002 | Boyle | |
| 2003/0234799 | A1* | 12/2003 | Lee | ................................ 345/660 |
| 2004/0103216 | A1 | 5/2004 | Lane | |
| 2005/0135682 | A1 | 6/2005 | Abrams | |
| 2005/0276496 | A1 | 12/2005 | Molgaard | |
| 2006/0017715 | A1 | 1/2006 | Kimura | |
| 2006/0037051 | A1 | 2/2006 | McDowell | |
| 2006/0093230 | A1 | 5/2006 | Hochmuth | |
| 2006/0117371 | A1 | 6/2006 | Margulis | |
| 2006/0159358 | A1 | 7/2006 | Yi | |
| 2006/0215755 | A1 | 9/2006 | Ju | |
| 2007/0081587 | A1 | 4/2007 | Raveendran | |
| 2007/0255926 | A1 | 11/2007 | Chuang | |
| 2009/0129478 | A1 | 5/2009 | Meroth | |
| 2009/0322713 | A1 | 12/2009 | Furihata | |
| 2010/0073574 | A1 | 3/2010 | Nakajima | |
| 2010/0158104 | A1 | 6/2010 | Lin | |
| 2010/0182402 | A1 | 7/2010 | Nakajima | |
| 2010/0328425 | A1 | 12/2010 | Nagaraj | |
| 2011/0075729 | A1* | 3/2011 | Dane et al. | ............... 375/240.03 |
| 2011/0249723 | A1* | 10/2011 | Wasily | ..................... 375/240.03 |
| 2012/0027317 | A1 | 2/2012 | Choi | |
| 2012/0068952 | A1 | 3/2012 | Slaby | |
| 2012/0072044 | A1 | 3/2012 | Slaby | |
| 2012/0072157 | A1 | 3/2012 | Alameh | |
| 2012/0134410 | A1 | 5/2012 | Kawasaki | |
| 2012/0163181 | A1* | 6/2012 | Xue et al. | ..................... 370/241 |
| 2012/0207155 | A1 | 8/2012 | Nelogal | |
| 2013/0088373 | A1 | 4/2013 | Takano | |
| 2013/0127980 | A1 | 5/2013 | Haddick | |
| 2013/0179659 | A1 | 7/2013 | Seo | |
| 2013/0293121 | A1 | 11/2013 | Viacheslav | |
| 2013/0322517 | A1* | 12/2013 | Zurpal | ................... H04N 19/56 |
| | | | | 375/240.02 |

FOREIGN PATENT DOCUMENTS

| | | |
|---|---|---|
| CN | 1838772 A | 9/2006 |
| CN | 101035086 A | 9/2007 |
| CN | 101237301 A | 8/2008 |
| CN | 101355364 A | 1/2009 |
| CN | 101378384 A | 3/2009 |
| CN | 101553795 A | 10/2009 |
| CN | 101616318 A | 12/2009 |
| CN | 101669361 A | 3/2010 |
| CN | 101682745 A | 3/2010 |
| CN | 101426132 B | 7/2010 |
| CN | 101803382 A | 8/2010 |
| CN | 201758429 U | 3/2011 |
| CN | 101340575 B | 4/2012 |
| CN | 102939630 A | 2/2013 |

OTHER PUBLICATIONS

"International Search Report" mailed on Dec. 19, 2013 for International application No. PCT/CN2013/083653, International filing date: Sep. 17, 2013.

"International Search Report" mailed on Dec. 5, 2013 for International application No. PCT/CN2013/083061, International filing date: Sep. 6, 2013.

"International Search Report" mailed on Jan. 2, 2014 for International application No. PCT/CN2013/084496, International filing date: Sep. 27, 2013.

"International Search Report" mailed on Jan. 2, 2014 for International application No. PCT/CN2013/084489, International filing date: Sep. 27, 2013.

"International Search Report" mailed on Dec. 26, 2013 for International application No. PCT/CN2013/083739, International filing date: Sep. 18, 2013.

* cited by examiner

| Type of Algorithm | Complexity | Power | Ratio M | Compression Efficiency |
|---|---|---|---|---|
| Compression Algorithm 1 | 5 (Highest) | 5 (Highest) | 1/8 | 5 (Highest) |
| Compression Algorithm 2 | 4 | 4 | 1/4 | 4 |
| Compression Algorithm 3 | 3 | 3 | 1/4 | 3 |
| Compression Algorithm 4 | 2 | 2 | 1/2 | 2 |
| Compression Algorithm 5 | 1 (Lowest) | 1 (Lowest) | 1/2 | 1 (Lowest) |

FIG. 2

DATA PROCESSING APPARATUS WITH ADAPTIVE COMPRESSION ALGORITHM SELECTION BASED ON VISIBILITY OF COMPRESSION ARTIFACTS FOR DATA COMMUNICATION OVER DISPLAY INTERFACE AND RELATED DATA PROCESSING METHOD

CROSS REFERENCE TO RELATED APPLICATIONS

This application claims the benefit of U.S. provisional application No. 61/711,319 (filed on Oct. 9, 2012) and U.S. provisional application No. 61/712,949 (filed on Oct. 12, 2012). The entire contents of the related applications are incorporated herein by reference.

BACKGROUND

The disclosed embodiments of the present invention relate to transmitting and receiving display data over a display interface, and more particularly, to a data processing apparatus with adaptive compression algorithm selection based on visibility of compression artifacts for data communication over a display interface and related data processing method.

A display interface is disposed between a first chip and a second chip to transmit display data from the first chip to the second chip for further processing. For example, the first chip may be a host application processor, and the second chip may be a driver integrated circuit (IC). The display data may include image data, video data, graphic data, and/or OSD (on-screen display) data. Besides, the display data may be single view data for two-dimensional (2D) display or multiple view data for three-dimensional (3D) display. When a display panel supports a higher display resolution, 2D/3D display with higher resolution can be realized. Hence, the display data transmitted over the display interface would have a larger data size/data rate, which increases the power consumption of the display interface inevitably. If the host application processor and the driver IC are both located at a portable device (e.g., a smartphone) powered by a battery device, the battery life is shortened due to the increased power consumption of the display interface. Thus, there is a need for an innovative design which can effectively reduce the power consumption of the display interface.

SUMMARY

In accordance with exemplary embodiments of the present invention, a data processing apparatus with adaptive compression algorithm selection based on visibility of compression artifacts for data communication over a display interface and related data processing method are proposed.

According to a first aspect of the present invention, an exemplary data processing apparatus is disclosed. The exemplary data processing apparatus includes a compressor and an output interface. The compressor is arranged for receiving an input display data and generating an output display data according to the input display data. The output interface is arranged for packing the output display data into an output bitstream, and outputting the output bitstream via a display interface. The compressor adaptively adjusts a compression algorithm applied to the input display data according to visibility of compression artifacts.

According to a second aspect of the present invention, an exemplary data processing method is disclosed. The exemplary data processing method includes at least the following steps: receiving an input display data; adaptively adjusting a compression algorithm according to visibility of compression artifacts; generating an output display data according to the compression algorithm and the input display data; and packing the output display data into an output bitstream, and outputting the output bitstream via a display interface.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a table showing characteristics of different compression algorithms supported by the compressor shown in FIG. 1.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The present invention proposes applying data compression to a display data and then transmitting a compressed display data over a display interface. As the data size/data rate of the compressed display data is smaller than that of the original un-compressed display data, the power consumption of the display interface is reduced correspondingly. Besides, the present invention further proposes an adaptive compression scheme which is based on side information given by a display processor, a viewing distance detector and/or a display panel. Thus may allow the configuration of a compressor to be adjusted in a static or dynamic way according to the side information. In general, data compression is exploited to remove the information redundancy under a specific pixel size (i.e., a unit size of compression) and produce a compressed data constrained by a compression ratio. The compression ratio M may be defined as below.

$$M = \frac{\text{amount of compressed data}}{\text{amount of un-compressed data}}$$

In a case where the compression ratio is equal to 0.5, the size of the compressed data is half of the size of the uncompressed data. As the compression performance is strongly related to some design factors such as the unit size of compression and the constrained compression ratio, the present invention therefore proposes using the adaptive compression scheme for enabling a compression algorithm selected from a plurality of candidate compression algorithms, where the selected compression algorithm most efficiently compresses the display data. Compared to a typical compression scheme using a fixed compression algorithm, the proposed adaptive compression scheme achieves better performance. Further details will be described as below.

Figure 1:
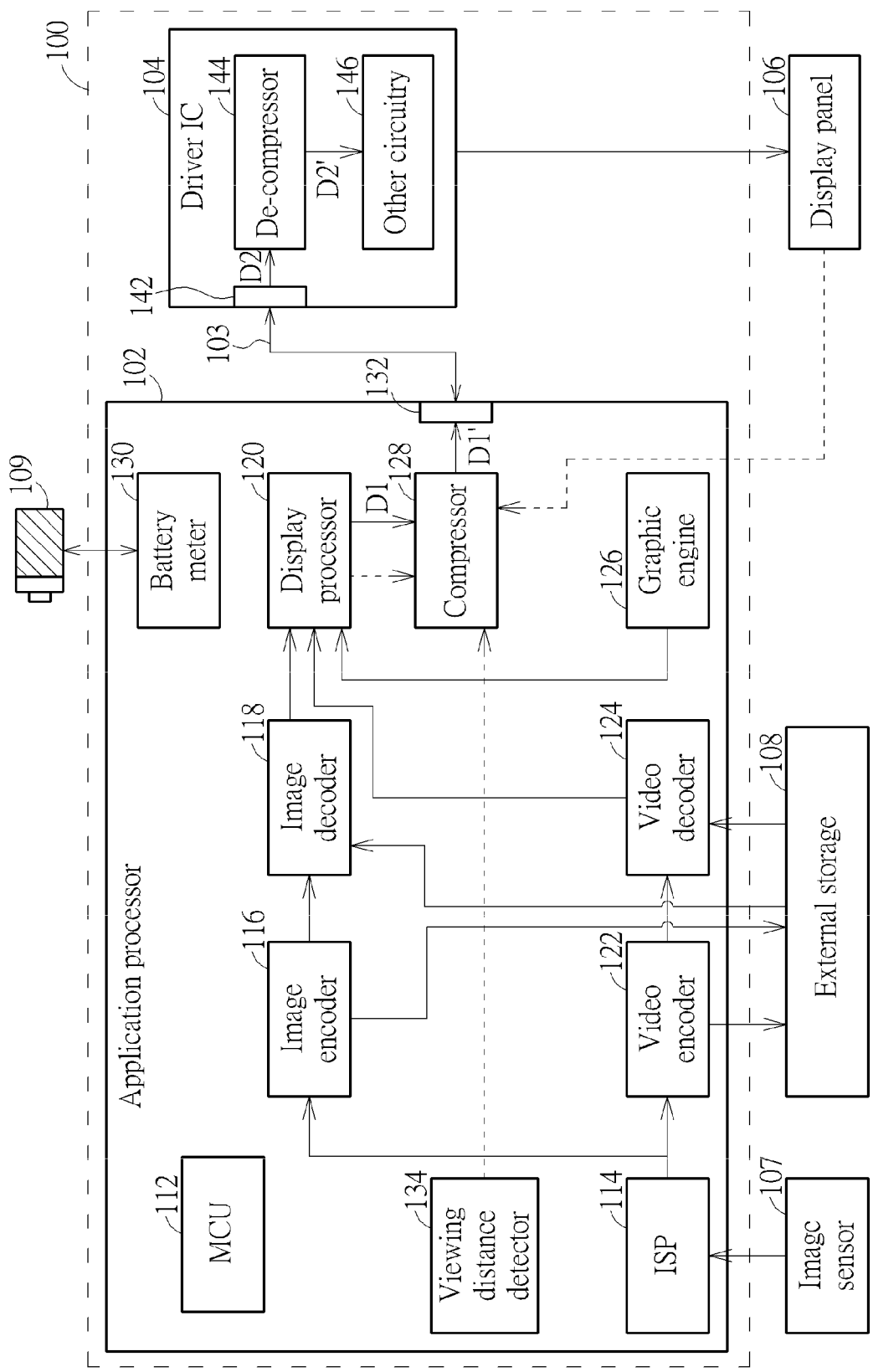
FIG. 1 is a block diagram illustrating a data processing system according to an embodiment of the present invention.

FIG. 1 is a block diagram illustrating a data processing system according to an embodiment of the present invention. The data processing system 100 includes a plurality of data processing apparatuses such as an application processor 102 and a driver integrated circuit (IC) 104. The application processor 102 and the driver IC 104 may be different chips, and the application processor 102 communicates with the driver IC 104 via a display interface 103. In this embodiment, the display interface 103 may be a display serial interface (DSI) standardized by a Mobile Industry Processor Interface (MIPI) or an embedded display port (eDP) standardized by a Video Electronics Standards Association (VESA).

The application processor 102 is coupled to the display interface 103, and supports un-compressed data transmission and compressed data transmission. When the application processor 102 is used to transmit un-compressed data to the driver IC 104 under a non-compression mode, the application processor 102 generates an un-compressed display data, and transmits the un-compressed display data over the display interface 103. When the application processor 102 is used to transmit compressed data to the driver IC 104 under a compression mode, the application processor 102 generates a compressed display data, and transmits the compressed display data over the display interface 103.

Regarding the driver IC 104, it is coupled to the display interface 103, and supports un-compressed data reception and compressed data reception. When the application processor 102 transmits the un-compressed data to the driver IC 104, the driver IC 104 is operated under a non-decompression mode to receive an un-compressed data from the display interface 103 and drive a display panel 106 according to the un-compressed display data. By way of example, the display panel 106 may be implemented using any 2D/3D display device (e.g. a retina display), and the pixel arrangement may be a rectangle layout, a triangle layout or a pentile layout. When the application processor 102 transmits the compressed data to the driver IC 104, the driver IC 104 is operated under a de-compression mode to receive a compressed display data from the display interface 103 and drive the display panel 106 according to a de-compressed display data derived from de-compressing the compressed display data. If there is no error introduced during the data transmission, the un-compressed data transmitted under the non-compression mode should be identical to the un-compressed data received under the non-decompression mode, and the compressed data transmitted under the compression mode should be identical to the compressed data received under the de-compression mode.

As shown in FIG. 1, the application processor 102 includes a micro control unit (MCU) 112, an image signal processor (ISP) 114, an image encoder 116, an image decoder 118, a display processor 120, a video encoder 122, a video decoder 124, a graphic engine 126, a compressor 128, a battery meter 130, an output interface 132, and a viewing distance detector 134. The battery meter 130 is arranged to monitor the power status of a power source such as the battery capacity of a battery device 109. The MCU 112 serves as a display controller which controls the operation of the application processor 102. For example, the MCU 112 controls the application processor 102 to operate under the compression mode or the non-compression mode. Besides, the MCU 112 may program the compressor 128 to use a default compression algorithm. The ISP 114 is coupled to an image sensor 107, and serves as a backend processor for an image/video output of the image sensor 107. For example, the ISP 114 may be used to perform auto white balance (AWB), auto exposure (AE) and auto focus (AF). In a case where the image sensor 107 generates a single captured image to the ISP 114 under a capture mode, a processed image generated from the ISP 114 may be transmitted to the image encoder 116, and an encoded image is generated from the image encoder 116 to an external storage 108 such as a dynamic random access memory (DRAM). In another case where the image sensor 107 generates a video sequence composed of successive captured images to the ISP 114 under a video recording mode, a processed video generated from the ISP 114 may be transmitted to the video encoder 122, and an encoded video is generated from the video encoder 122 to the external storage 108.

The image decoder 118 receives an encoded image from the external storage 108, and generates a decoded image to the display processor 120. The video decoder 124 receives an encoded video from the external storage 108, and generates a decoded video to the display processor 120. However, it is possible that the single captured image/video sequence generated from the ISP 114 may be bypassed to the display processor 120 without additional encoding and decoding operations applied thereto. The graphic engine 126 is arranged to generate graphic data (e.g., a 3D graphic image) to the display processor 120.

The display processor 120 may generate an input display data D1 based on one or more of the image data, video data, text data (i.e., text-rich image data), graphic data, etc. In this embodiment, the display processor 120 may further perform image processing operations, including scaling, rotating, etc. For example, the display processor 120 may employ an image scaling ratio to scale up or down each image included in an original display data to generate the input display data D1 composed of scaled-up/scaled-down image(s) to the compressor 128 when the application processor 102 is operated under the compression mode.

The compressor 128 is arranged to perform data compression upon the input display data D1 generated from the display processor 120, and accordingly generate an output display data D1', wherein the compressed display data (i.e., output display data D1') is packed/packetized into an output bitstream by the output interface 132 according to the transmission protocol of the display interface 103, and the output bitstream is transmitted to the driver IC 104 via the display interface 103.

The driver IC 104 includes an input interface 142, a de-compressor 144 and other circuitry 146. The input interface 142 receives an input bitstream from the display interface 103, and un-packs/un-packetizes the input bitstream into an input display data D2 which is a compressed display data when the application processor 102 is operated under a compression mode. In this embodiment, the de-compressor 132 is arranged to perform data de-compression upon the input display data D2, and accordingly generate a de-compressed display data D2'. The other circuitry 146 is arranged to drive the display panel 106 according to the de-compressed display data D2'.

As the present invention focuses on the adaptive compression scheme for configuring a compressor, further details directed to transmitting compressed/un-compressed display data from the application processor 102 to the driver IC 104 via the display interface 103 and driving the display panel 106 based on the compressed/un-compressed display data received from the display interface 103 are omitted here for brevity.

In this embodiment, the compressor 128 supports a plurality of compression algorithms having different compression characteristics. Please refer to FIG. 2, which is a table showing characteristics of different compression algorithms supported by the compressor 128 shown in FIG. 1. A compression algorithm represents a set of coding tools so as to remove the data redundancy on the input display data D1. The coding tools may be any kind of compression methods developed by proprietary algorithms or specified by state-of-the-art video standards (e.g., MPEG-1/2/4, H.261/262/263/264, and HEVC) or image standards (e.g., JPEG, JPEG-1s, JPEG-2000, JPEG-XR, PNG, and GIF). As shown in FIG. 2, these compression algorithms indicate different capability of compression performance in terms of compression ratio, compression efficiency, compression complexity, and power dissipation. Specifically, the compression efficiency is the ability of a compression algorithm to encode the input display data D1 at the lowest possible bit rate while maintaining a certain level of visual quality. There are two standard ways to measure the compression efficiency of a compression algorithm. One is to use an objective metric, such as a peak signal-to-noise ratio (PSNR). The other is to use a subjective assessment of video/image quality. If the compression efficiency of a compression algorithm is high, it means that the compression algorithm can preserve more input data information after compression is performed under a certain compression ratio. If the compression efficiency of a compression algorithm is low, it means that the compression algorithm will lose more input data information after compression is performed under a certain compression ratio. As a result, more compression artifacts may be introduced by a compression algorithm with lower compression efficiency. Hence, a high compression efficiency algorithm can preserve more input data information under a certain compression ratio, and the de-compressed display data can have better visual appearance and visual quality due to fewer compression artifacts.

In this embodiment, the compressor 128 is capable of adaptively adjusting a compression algorithm by referring to at least the side information shown as dotted lines in FIG. 1, where the side information may be provided by at least one of viewing distance detector 134, display processor 120, and display panel 106. As the compressor 128 refers to the side information to select an adequate compression algorithm from supported compression algorithms having different compression characteristics, the compression performance can be optimized. For better understanding of technical features of the present invention, several embodiments are illustrated as below.

Specifically, the compressor 128 adaptively adjusts a compression algorithm applied to the input display data D1 according to visibility of compression artifacts. The compression artifacts by lossy compression algorithms are generally related to the pixel size of the processed image. A large pixel size indicates higher probability of artifact occurrence which may be easily perceived by human eyes, while a smaller pixel size means the compression error may not be noticeable. The pixel size depends on the display panel size and the image resolution. By way of example, pixels per inch (PPI) or pixel density may serve as a measurement of visibility of compression artifacts. In a case where a 5-inch display panel is used to display an image with an image resolution of 1920×1080, the diagonal resolution in pixels $D_P$ is equal to $\sqrt{1920^2+1080^2}$, and the diagonal resolution in inches $D_i$ is 5. Hence, the PPI value under such a display condition may be expressed using the following equation.

$$PPI=D_P/D_i=\sqrt{1920^2+1080^2}/5=440 \qquad (1)$$

Figure 3:
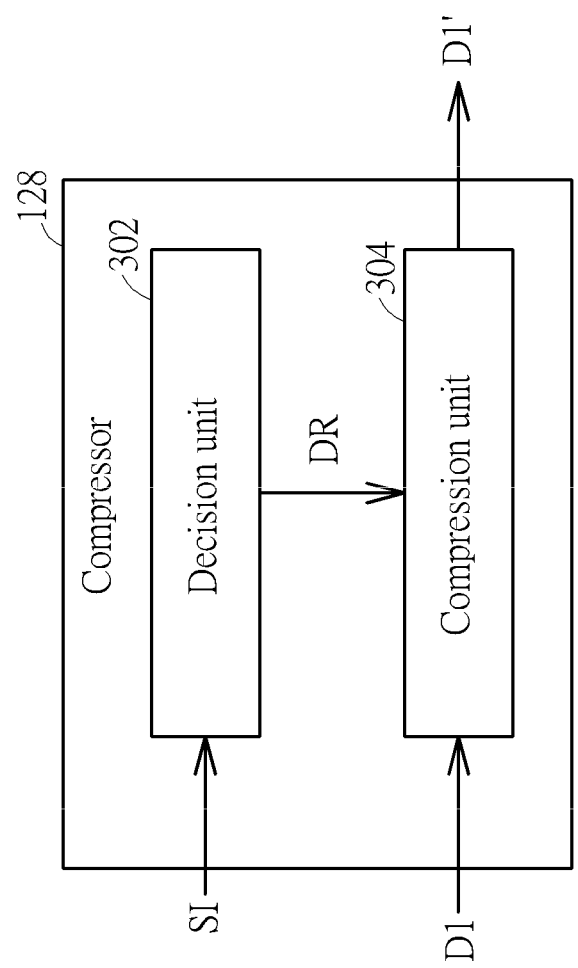
FIG. 3 is a diagram illustrating an embodiment of the compressor shown in FIG. 1.
Figure 4:
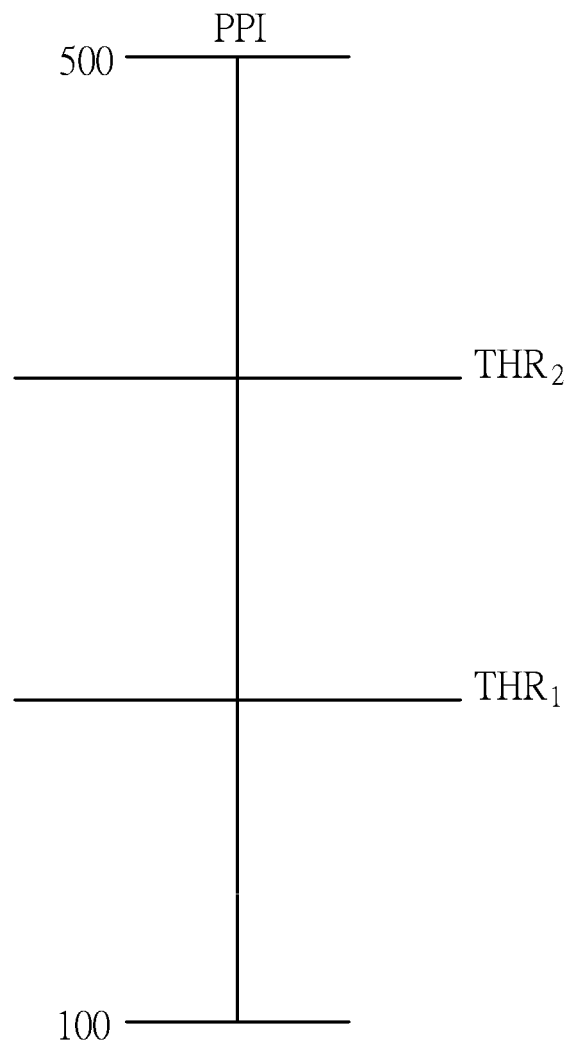
FIG. 4 is a diagram illustrating thresholds of the PPI value.

The pixel size is inversely proportional to the PPI value. That is, the larger is the PPI value, the pixel size is smaller. Therefore, the PPI value is indicative of the visibility of compression artifacts. In a first exemplary embodiment, the compressor 128 may adaptively adjust a compression algorithm applied to the input display data D1 according to a pixel density of a display apparatus (e.g., the PPI value of the display panel 106). Please refer to FIG. 3, which is a diagram illustrating an embodiment of the compressor 128 shown in FIG. 1. The compressor 128 includes a decision unit 302 and a compression unit 304. The decision unit 302 may receive side information SI from the display panel 106 and the display processor 120, and estimates the PPI value of the display panel 106 based on the display panel size and the image resolution included in the side information SI. In addition, the decision unit 302 compares the obtained PPI value with at least one predetermined threshold to generate a decision result DR. The compression unit 304 supports a plurality of compression algorithms having different characteristics, and refers to the decision result DR to select one of the supported compression algorithms for data compression. For example, as shown in FIG. 4, the decision unit 302 employs a first predetermined threshold $THR_1$ and a second predetermined threshold $THR_2$, where $THR_2 > THR_1$. The compression algorithm is adaptively chosen according to the physical PPI value from display's point of view. When the PPI value is large (i.e., pixel size is small), the compression artifacts are hard to be seen by the end-user, and a less complex and lower power dissipation compression algorithm may be selected to save power. When the PPI value is small (i.e., pixel size is large), the compression artifacts are easier to be seen by the end-user, and a more complex and higher power dissipation compression algorithm is selected to ensure visual quality.

Based on above observation, the first predetermined threshold $THR_1$ may be checked to see if the data compression with fewer compression artifacts should be employed to avoid visual quality degradation, and the second predetermined threshold $THR_2$ may be checked to see if the data compression with more compression artifacts is allowed to be used for reducing the power consumption. Hence, the compressor 128 is arranged to employ the compression algorithm $N_1$ when the decision result DR indicates that the PPI value is smaller than the first predetermined threshold $THR_1$ (i.e., visibility of compression artifacts is high), employ the compression algorithm $N_2$ when the decision result DR indicates that the PPI value is between the first predetermined threshold $THR_1$ and the second predetermined threshold $THR_2$ (i.e., visibility of compression artifacts is medium), and employ the compression algorithm $N_3$ when the decision result DR indicates that the PPI value is larger than the second predetermined threshold $THR_2$ (i.e., visibility of compression artifacts is low). The compression algorithm $N_1$ is more complex than the compression algorithm $N_2$, and/or the compression algorithm $N_1$ has a higher compression efficiency than the compression algorithm $N_2$. Besides, the compression algorithm $N_2$ is more complex than the compression algorithm $N_3$, and/or the compression algorithm $N_2$ has a higher compression efficiency than the compression algorithm $N_3$. To put it simply, the compression algorithm used by the compressor 128 is set by a first compression algorithm when the pixel density is higher than a predetermined threshold, and the compression algorithm used by the compressor 128 is set by a second compression algorithm when the pixel density is not higher than the predetermined threshold, where the second compression algorithm is more complex than the first compression algorithm.

Figure 5:
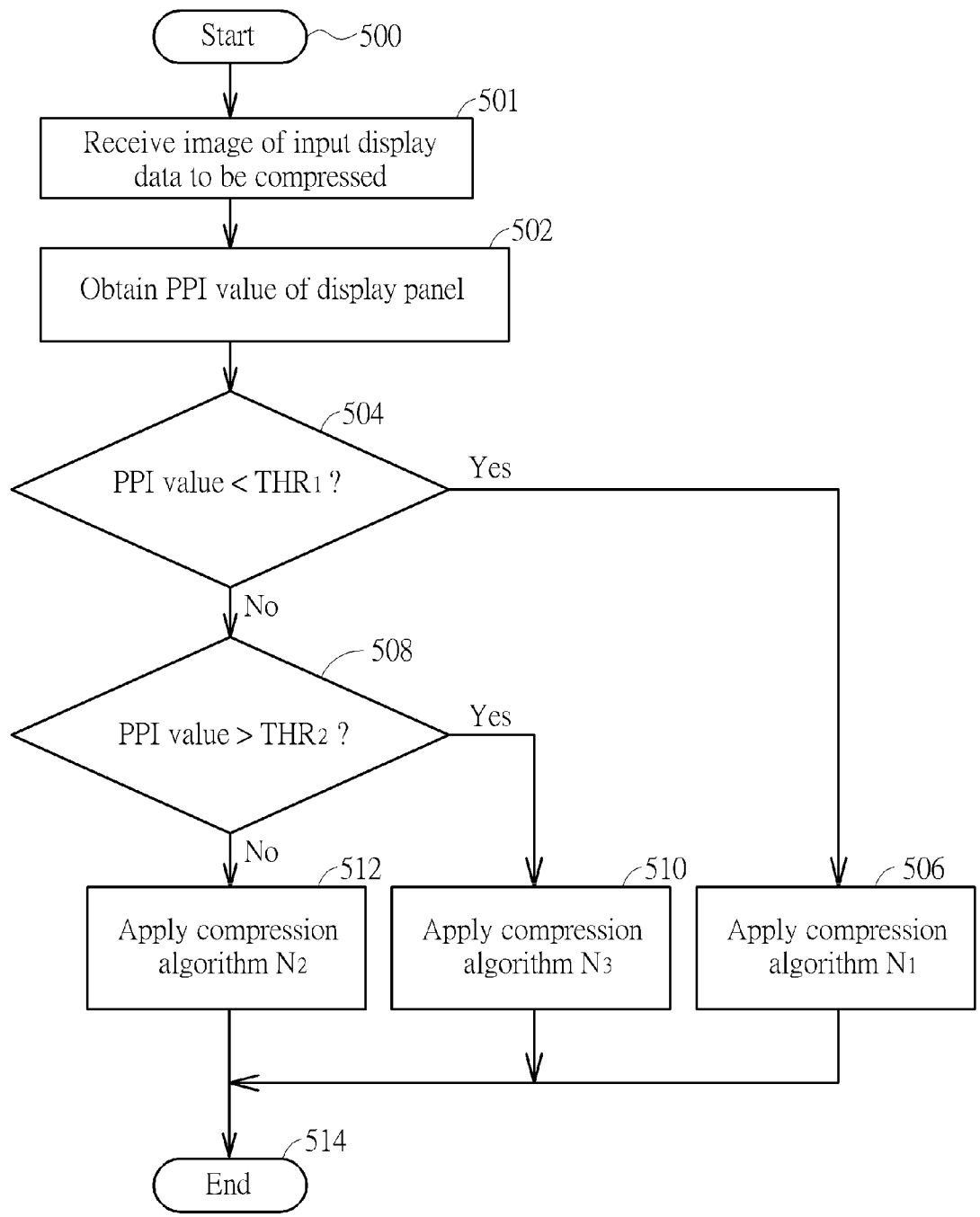
FIG. 5 is a flowchart illustrating an adaptive compression method based on a pixel density of a display apparatus according to an embodiment of the present invention.

FIG. 5 is a flowchart illustrating an adaptive compression method based on a pixel density of a display apparatus according to an embodiment of the present invention. Provided that the result is substantially the same, the steps are not required to be executed in the exact order shown in FIG. 5. The exemplary adaptive compression method may be briefly summarized by following steps.

Step 500: Start.

Step 501: Receive an image of the input display data D1 to be compressed.

Step 502: Refer to side information SI to obtain the PPI value of the display panel 106.

Step 504: Check if the PPI value is smaller than the first predetermined threshold $THR_1$. If yes, go to step 506; otherwise, go to step 508.

Step 506: Apply the compression algorithm $N_1$ to the image. Go to step 514.

Step 508: Check if the PPI value is larger than the second predetermined threshold $THR_2$. If yes, go to step 510; otherwise, go to step 512.

Step 510: Apply the compression algorithm $N_3$ to the image. Go to step 514.

Step 512: Apply the compression algorithm $N_2$ to the image.

Step 514: End.

It should be noted that steps 502, 504, 508 are performed by the decision unit 302, and steps 501, 506, 510, 512 are performed by the compression unit 304. As a person skilled in the art can readily understand details of each step shown in FIG. 5 after reading above paragraphs, further description is omitted here for brevity.

As mentioned above, the display processor 120 may employ an image scaling ratio to scale up or down each image included in an original display data to generate the input display data D1. Thus, the image resolution may be scaled up or down by the display processor 120, which affects the pixel size correspondingly. The side information SI received by the decision unit 302 may further include the image scaling ratio. Therefore, the decision unit 302 may further refer to the image scaling ratio to determine the decision result DR. The decision unit 302 obtains the PPI value based on the display panel size and the scaled-up/scaled-down image resolution, and then compares the PPI value with at least one predetermined threshold (e.g., $THR_1$ and $THR_2$) to determine the decision result DR. More specifically, the compressor 128 is arranged to employ a first compression algorithm for compressing the input display data D1 when the image scaling factor is larger than a predetermined threshold, and employ a second compression algorithm for compressing the input display data D1 when the image scaling factor is not larger than the predetermined threshold. By way of example, when the image scaling factor is a scaling-up factor, the first compression algorithm is more complex than the second compression algorithm; and when the image scaling factor is a scaling-down factor, the first compression algorithm is less complex than the second compression algorithm.

Figure 6:
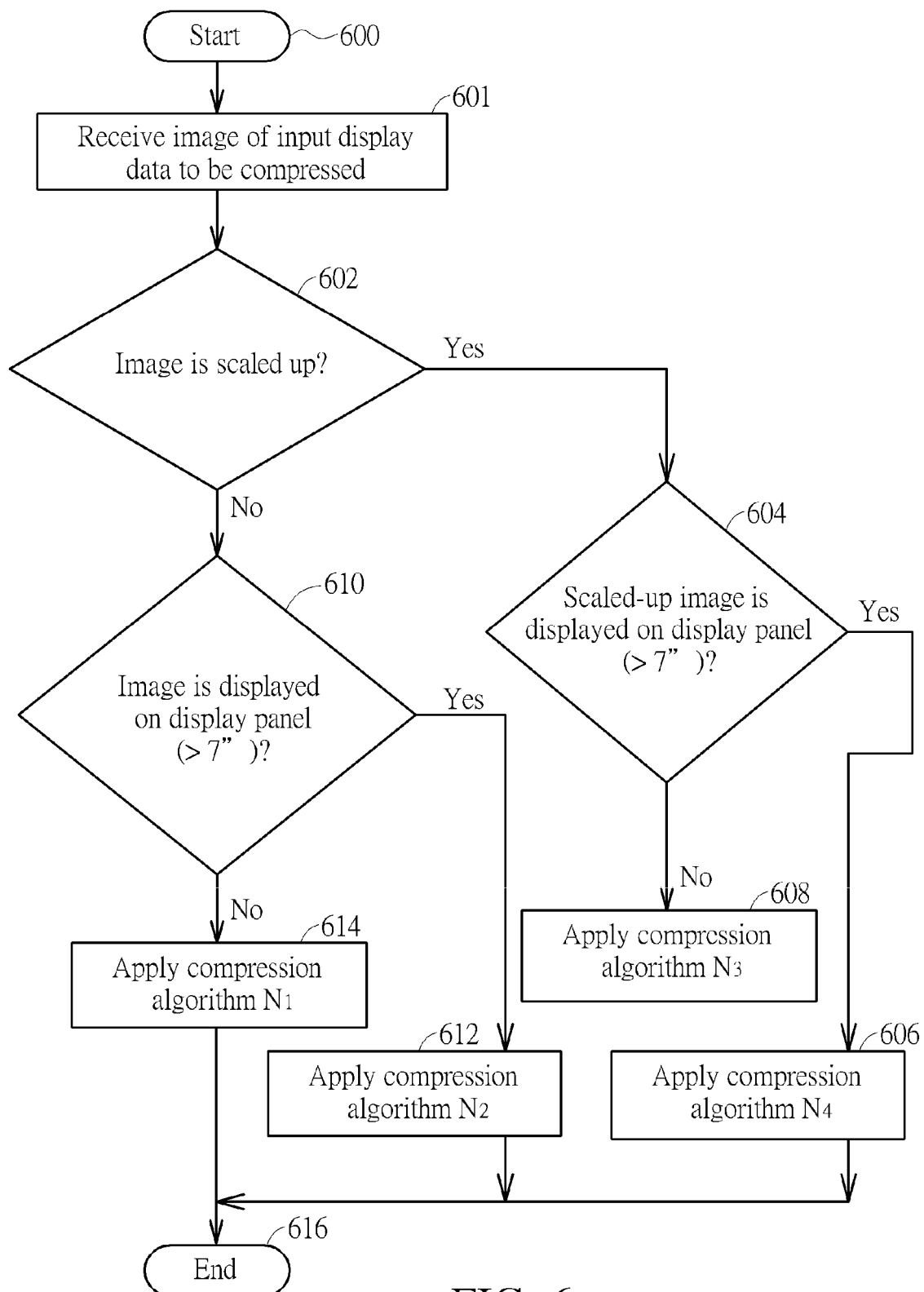
FIG. 6 is a flowchart illustrating an adaptive compression method based on a pixel density of a display apparatus according to another embodiment of the present invention.

FIG. 6 is a flowchart illustrating an adaptive compression method based on a pixel density of a display apparatus according to another embodiment of the present invention. Provided that the result is substantially the same, the steps are not required to be executed in the exact order shown in FIG. 6. The exemplary adaptive compression method may be briefly summarized by following steps.

Step 600: Start.

Step 601: Receive an image of the input display data D1 to be compressed.

Step 602: Refer to side information SI to determine if the image is scaled up. If yes, go to step 604; otherwise, go to step 610.

Step 604: Refer to the side information SI to check if the scaled-up image is to be displayed on the display panel 106 with a panel size larger than a predetermined threshold (e.g., 7"). If yes, go to step 606; otherwise, go to step 608.

Step 606: Apply the compression algorithm $N_4$ to the scaled-up image. Go to step 616.

Step 608: Apply the compression algorithm $N_3$ to the scaled-up image. Go to step 616.

Step 610: Refer to the side information SI to check if the image is to be displayed on the display panel 106 with a panel size larger than the predetermined size (e.g., 7"). If yes, go to step 612; otherwise, go to step 614.

Step 612: Apply the compression algorithm $N_2$ to the image. Go to step 616.

Step 614: Apply the compression algorithm $N_1$ to the image.

Step 616: End.

As shown in FIG. 6, one of four different compression algorithms $N_1$-$N_4$ is selected by the compressor 128 based on the PPI value determined by the display panel size and the image resolution. The same objective of adaptively adjusting the compression algorithm according to the display density of the display apparatus is achieved.

In above embodiments, the compression algorithm is adaptively chosen according to the physical PPI value from display's point of view. In an alternative design, the compression algorithm may be adaptively chosen according to a virtual PPI value from sensor's point of view. More specifically, the pixel size perceived by a viewer is related to the viewing distance between the viewer and a display apparatus such as the display panel 106, where the viewing distance may be estimated using an appropriate sensor. As shown in FIG. 1, the viewing distance detector 134 is arranged to detect the viewing distance between the viewer and the display panel 106, and provides the side information indicative of the detected viewing distance to the compressor 128. By way of example, but not limitation, the viewing distance detector 134 may be implemented using a distance sensor, an active infrared ray (IR) range meter, or a human face detector which estimates the distance according to the size of the human face. For example, one implementation of the human face detector may compare the captured human face identified in the image generated from the image sensor 107 with a normal human face size to determine the viewing distance.

Figure 7:
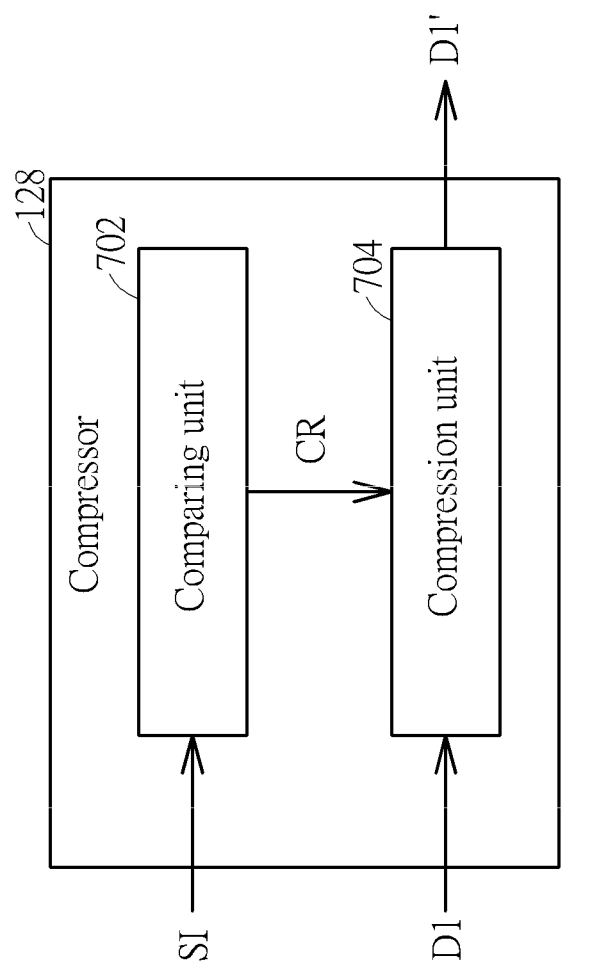
FIG. 7 is a diagram illustrating another embodiment of the compressor shown in FIG. 1.
Figure 8:
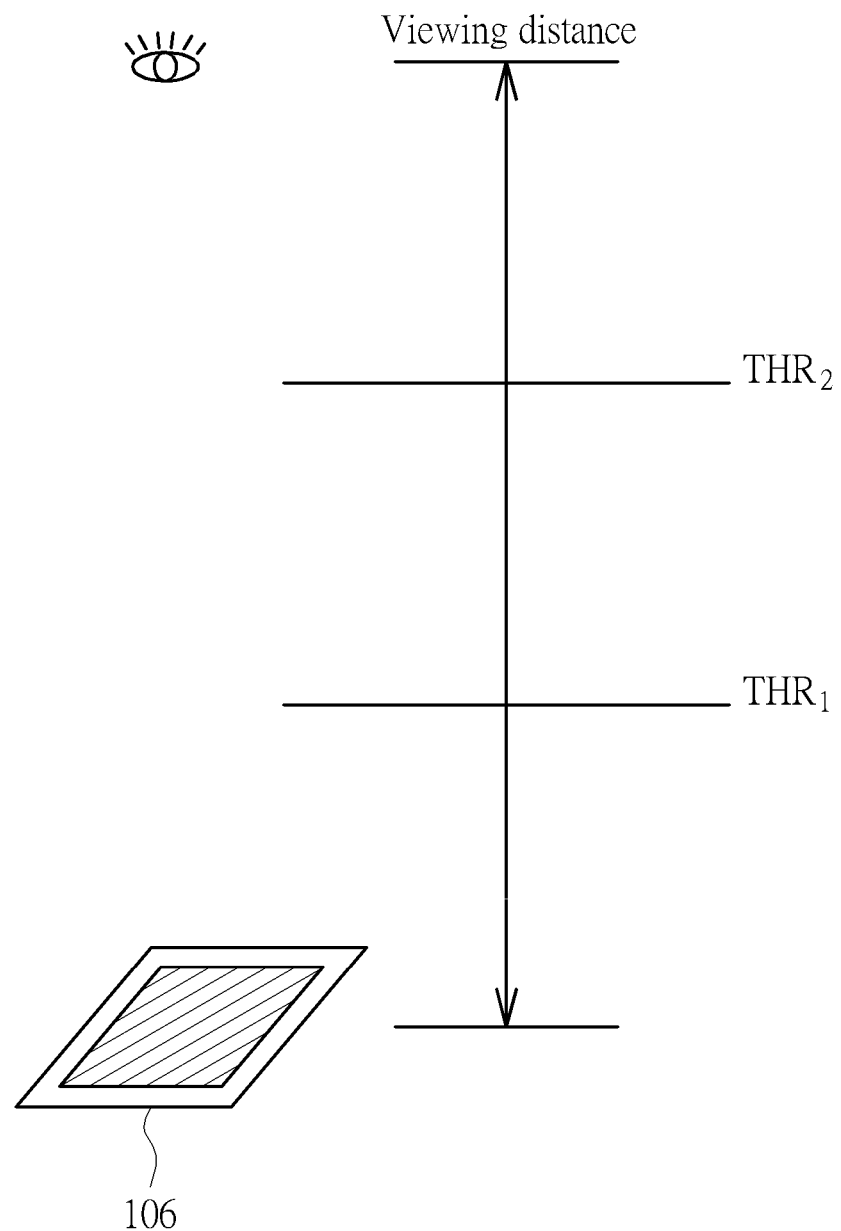
FIG. 8 is a diagram illustrating thresholds of the viewing distance.

In a second exemplary embodiment, the compressor 128 may adaptively adjust a compression algorithm applied to the input display data D1 according to the distance between the display apparatus and the viewer of the display apparatus (e.g., the viewing distance detected by the viewing distance detector 134). Please refer to FIG. 7, which is a diagram illustrating another embodiment of the compressor 128 shown in FIG. 1. The compressor 128 includes a comparing unit 702 and a compression unit 704. The comparing unit 702 may receive side information SI from the viewing distance detector 134, and compares the detected viewing distance with at least one predetermined threshold to generate a comparison result CR. The compression unit 704 supports a plurality of compression algorithms having different characteristics, and refers to the comparison result CR to select one of the supported compression algorithms for data compression. For example, as shown in FIG. 8, the comparing unit 702 employs a first predetermined threshold $THR_1$ and a second predetermined threshold $THR_2$, where $THR_2 > THR_1$. The compression algorithm is adaptively chosen according to the virtual PPI value from sensor's point of view. When the viewing distance is far (i.e., the perceived pixel size is small), the compression artifacts are hard to be seen by the viewer of the display panel 106, a less complex and lower power dissipation compression algorithm is selected to save power. When the viewing distance is near (i.e., the perceived pixel size is large), the compression artifacts are easier to be seen by the viewer of the display panel 106, a more complex and higher power dissipation compression algorithm is selected to ensure visual quality.

Based on above observation, the first predetermined threshold $THR_1$ may be checked to see if the data compression with fewer compression artifacts should be employed to avoid visual quality degradation, and the second predetermined threshold $THR_2$ may be checked to see if the data compression with more compression artifacts is allowed to be used for reducing the power consumption. More specifically, the compressor 128 is arranged to employ the compression algorithm $N_1$ when the comparing result CR indicates that the detected viewing distance is smaller than the first predetermined threshold $THR_1$ (i.e., visibility of compression artifacts is high), employ the compression algorithm $N_2$ when the comparison result CR indicates that the detected viewing distance is between the first predetermined threshold $THR_1$ and the second predetermined threshold $THR_2$ (i.e., visibility of compression artifacts is medium), and employ the compression algorithm $N_3$ when the comparison result CR indicates that the detected viewing distance is larger than the second predetermined threshold $THR_2$ (i.e., visibility of compression artifacts is low). The compression algorithm $N_1$ is more complex than the compression algorithm $N_2$, and/or the compression algorithm $N_1$ has a higher compression efficiency than the compression algorithm $N_2$. Besides, the compression algorithm $N_2$ is more complex than the compression algorithm $N_3$, and/or the compression algorithm $N_2$ has a higher compression efficiency than the compression algorithm $N_3$. To put it simply, the compression algorithm used by the compressor 128 is set by a first compression algorithm when the distance is smaller than a predetermined threshold, and the compression algorithm used by the compressor 128 is set by a second compression algorithm when the distance is not smaller than the predetermined threshold, where the first compression algorithm is more complex than the second compression algorithm.

Figure 9:
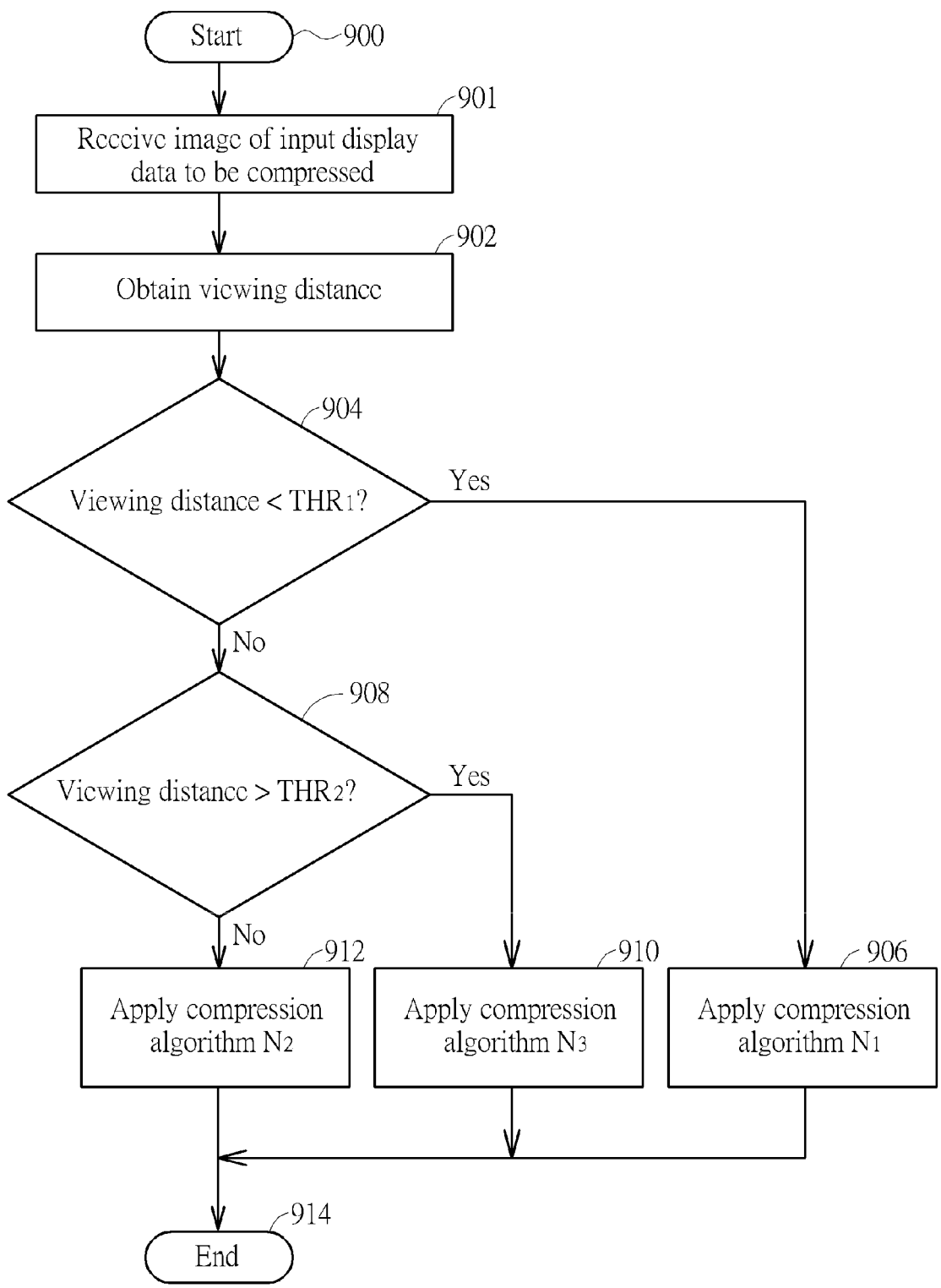
FIG. 9 is a flowchart illustrating an adaptive compression method based on a distance between a display apparatus and a viewer according to an embodiment of the present invention.

FIG. 9 is a flowchart illustrating an adaptive compression method based on a distance between a display apparatus and a viewer according to an embodiment of the present invention. Provided that the result is substantially the same, the steps are not required to be executed in the exact order shown in FIG. 9. The exemplary adaptive compression method may be briefly summarized by following steps.

Step 900: Start.

Step 901: Receive an image of the input display data D1 to be compressed.

Step 902: Refer to side information SI to obtain the detected viewing distance.

Step 904: Check if the detected viewing distance is smaller than the first predetermined threshold $THR_1$. If yes, go to step 906; otherwise, go to step 908.

Step 906: Apply the compression algorithm $N_1$ to the image. Go to step 914.

Step 908: Check if the detected viewing distance is larger than the second predetermined threshold $THR_2$. If yes, go to step 910; otherwise, go to step 912.

Step 910: Apply the compression algorithm $N_3$ to the image. Go to step 914.

Step 912: Apply the compression algorithm $N_2$ to the image.

Step 914: End.

It should be noted that steps 902, 904, 908 are performed by the comparison unit 702, and steps 901, 906, 910, 912 are performed by the compression unit 704. As a person skilled in the art can readily understand details of each step shown in FIG. 9 after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data processing apparatus comprising:
   a compressor, arranged for receiving an input display data and generating an output display data according to the input display data; and
   an output interface, arranged for packing the output display data into an output bitstream, and outputting the output bitstream via a display interface;
   wherein the compressor adaptively adjusts a compression algorithm applied to the input display data according to visibility of compression artifacts by referring to at least a pixel density of a display apparatus or referring to at least a distance between the display apparatus and a viewer of the display apparatus; and
   wherein contents carried by the output display data transmitted via the display interface are displayed on the display apparatus, and the compressor adaptively adjusts the compression algorithm by referring to at least the pixel density of the display apparatus or at least the distance between the display apparatus and the viewer of the display apparatus, wherein when referring to at least the pixel density, the compressor is arranged to employ a first compression algorithm as the compression algorithm when the pixel density is higher than a first predetermined threshold, and employ a second compression algorithm as the compression algorithm when the pixel density is not higher than the first predetermined threshold, and when referring to at least the compressor is arranged to employ a third compression algorithm as the compression algorithm when the distance is smaller than a second predetermined threshold, and employ a fourth compression algorithm as the compression algorithm when the distance is not smaller than the second predetermined threshold, where the second compression algorithm is different from the first compression algorithm and the fourth compression algorithm is different from the third compression algorithm.

2. The data processing apparatus of claim 1, wherein the display interface is a display serial interface (DSI) standardized by a Mobile Industry Processor Interface (MIPI) or an embedded display port (eDP) standardized by a Video Electronics Standards Association (VESA).

3. The data processing apparatus of claim 1, wherein the second compression algorithm is more complex than the first compression algorithm.

4. The data processing apparatus of claim 1, wherein the compressor adaptively adjusts the compression algorithm by referring to at least a scaling factor associated with the input display data.

5. The data processing apparatus of claim 4, wherein the compressor is arranged to employ a fifth compression algorithm as the compression algorithm when the scaling factor is higher than a third predetermined threshold, and employ a sixth compression algorithm as the compression algorithm when the scaling factor is not higher than the third predetermined threshold, where the sixth compression algorithm is different from the fifth compression algorithm.

6. The data processing apparatus of claim 5, wherein when the scaling factor is a scaling-up factor, the fifth compression algorithm is more complex than the sixth compression algorithm; and when the scaling factor is a scaling-down factor, the fifth compression algorithm is less complex than the sixth compression algorithm.

7. The data processing apparatus of claim 1, wherein the third compression algorithm is more complex than the fourth compression algorithm.

8. A data processing method comprising:
  receiving an input display data;
  adaptively adjusting a compression algorithm according to visibility of compression artifacts by referring to at least a pixel density of a display apparatus or referring to at least a distance between the display apparatus and a viewer of the display apparatus;
  generating an output display data according to the compression algorithm and the input display data; and
  packing the output display data into an output bitstream, and outputting the output bitstream via a display interface;
  wherein contents carried by the output display data transmitted via the display interface are displayed on the display apparatus, and the step of adaptively adjusting the compression algorithm comprises:
  referring to at least the pixel density of the display apparatus or referring to at least the distance between the display apparatus and the viewer of the display apparatus to adaptively adjust the compression algorithm;
  wherein when the compression algorithm is adaptively adjusted by referring to at least the pixel density, the compression algorithm is set by a first compression algorithm when the pixel density is higher than a first predetermined threshold, and the compression algorithm is set by a second compression algorithm when the pixel density is not higher than the first predetermined threshold, and when the compression algorithm is adaptively adjusted by referring to at least the distance, the compression algorithm is set by a third compression algorithm when the distance is smaller than a second predetermined threshold, and the compression algorithm is set by a fourth compression algorithm when the distance is not smaller than the second predetermined threshold, where the second compression algorithm is different from the first compression algorithm and the fourth compression algorithm is different from the third compression algorithm.

9. The data processing method of claim 8, wherein the display interface is a display serial interface (DSI) standardized by a Mobile Industry Processor Interface (MIPI) or an embedded display port (eDP) standardized by a Video Electronics Standards Association (VESA).

10. The data processing method of claim 8, wherein the second compression algorithm is more complex than the first compression algorithm.

11. The data processing method of claim 8, wherein step of adaptively adjusting the compression algorithm comprises:
  referring to at least a scaling factor associated with the input display data to adaptively adjust the compression algorithm.

12. The data processing method of claim 11, wherein the compression algorithm is set by a fifth compression algorithm when the scaling factor is higher than a third predetermined threshold, and the compression algorithm is set by a sixth compression algorithm when the scaling factor is not higher than the third predetermined threshold, where the sixth compression algorithm is different from the fifth compression algorithm.

13. The data processing method of claim 12, wherein when the scaling factor is a scaling-up factor, the fifth compression algorithm is more complex than the sixth compression algorithm; and when the scaling factor is a scaling-down factor, the fifth compression algorithm is less complex than the sixth compression algorithm.

14. The data processing method of claim 8, wherein the third compression algorithm is more complex than the fourth compression algorithm.

15. A data processing apparatus comprising:
  a compressor, arranged for receiving an input display data, and generating an output display data according to the input display data; and
  an output interface, arranged for packing the output display data into an output bitstream, and outputting the output bitstream via a display interface to a second apparatus;
  wherein the compressor adaptively adjusts a compression algorithm applied to the input display data according to visibility of compression artifacts by referring to at least a pixel density of a display apparatus, referring to at least a scaling factor associated with the input display data, or referring to at least a distance between the display apparatus and a viewer of the display apparatus; and
  wherein the data processing apparatus and the second apparatus are located at different chips, respectively; the compressor and the output interface are included in a first chip, the second apparatus is included in a second chip; and the display interface is a chip-to-chip interface that provides direct pin connections between the first chip and the second chip.

16. A data processing method comprising:

receiving an input display data;

adaptively adjusting a compression algorithm according to visibility of compression artifacts by referring to at least a pixel density of a display apparatus, referring to at least a scaling factor associated with the input display data, or referring to at least a distance between the display apparatus and a viewer of the display apparatus;

generating an output display data according to the compression algorithm and the input display data in a first chip; and packing the output display data into an output bitstream in the first chip, and outputting the output bitstream via a display interface to a second apparatus included in a second chip different from the first chip, wherein the display interface is a chip-to-chip interface that provides direct pin connections between the first chip and the second chip.

\* \* \* \* \*